F. P. JOHNSON.
TIRE FASTENING DEVICE.
APPLICATION FILED MAY 27, 1912.
1,262,504.
Patented Apr. 9, 1918.
2 SHEETS—SHEET 1.
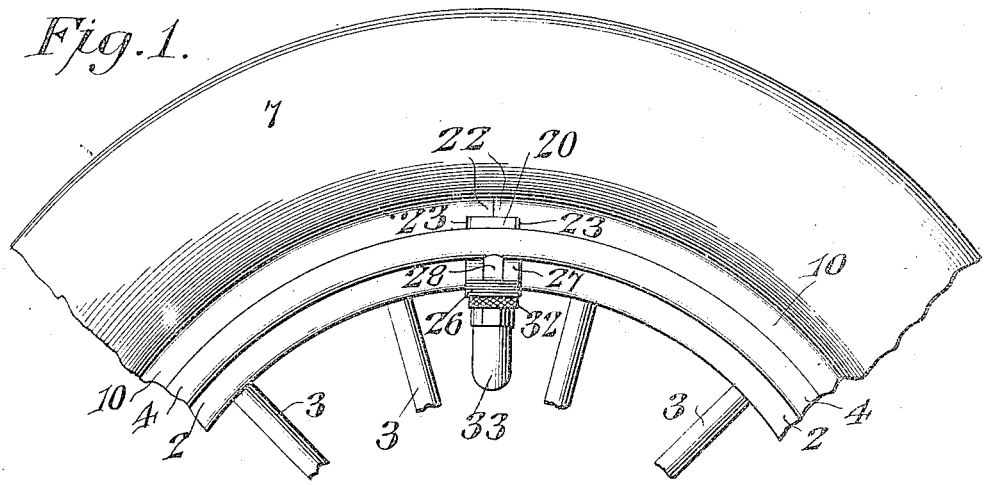
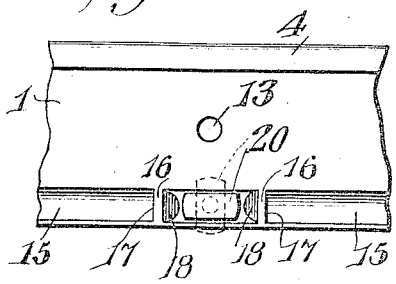
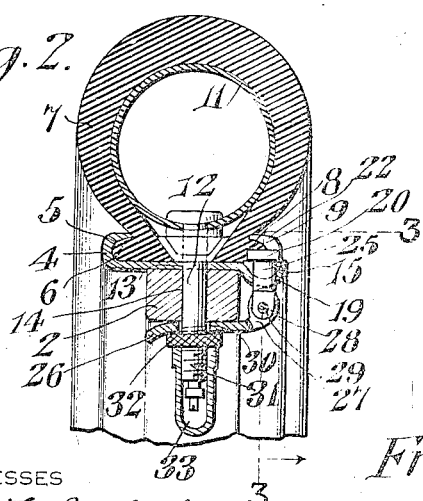
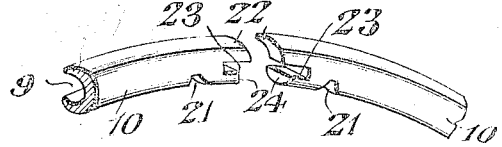
Frank P. Johnson, INVENTOR
WITNESSES

F. P. JOHNSON.
TIRE FASTENING DEVICE.
APPLICATION FILED MAY 27, 1912.

1,262,504.

Patented Apr. 9, 1918.
2 SHEETS—SHEET 2.

WITNESSES

Frank P. Johnson, INVENTOR

BY

ATTORNEY

UNITED STATES PATENT OFFICE.

FRANK P. JOHNSON, OF DANVILLE, PENNSYLVANIA.

TIRE-FASTENING DEVICE.

1,262,504.  Specification of Letters Patent.  Patented Apr. 9, 1918.

Application filed May 27, 1912. Serial No. 699,965.

*To all whom it may concern:*

Be it known that I, FRANK P. JOHNSON, a citizen of the United States, residing at Danville, in the county of Montour and State of Pennsylvania, have invented a new and useful Tire-Fastening Device, of which the following is a specification.

The invention relates to improvements in tire fastening devices.

The object of the present invention is to improve the construction of tire fastening devices, and to provide a simple, safe and efficient tire fastening device of inexpensive construction, designed for securing a pneumatic tire of the detachable type to the rim of an automobile or other vehicle wheel, and enabling a pneumatic tire to be easily and quickly removed when it is desired to replace or repair an inner tube.

A further object of the invention is to provide a device for the purpose stated which shall be proof against accidental disconnection, and which when the tire is removed from the rim will remain on the rim so that the parts may not be lost nor mislaid, and which may be readily operated without the use of any special tools.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—

Figure 1 is a side elevation of a portion of a wheel equipped with a tire fastening device, constructed in accordance with this invention.

Fig. 2 is a transverse sectional view of the same.

Fig. 3 is a detail longitudinal sectional view on the line 3—3 of Fig. 2.

Fig. 4 is a plan view of a portion of the rim, illustrating the arrangement of the locking member.

Fig. 5 is a detail perspective view of the terminal portions of the split tire retaining ring.

Fig. 6 is a detail perspective view of the T-shaped locking member and the hasp member.

Like numerals of reference designate corresponding parts in all the figures of the drawing.

Figure 7:
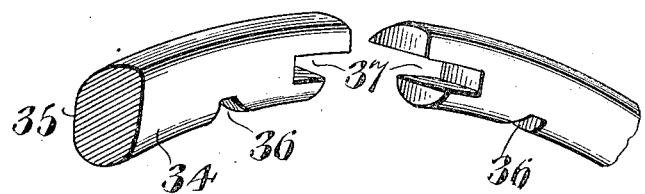
Fig. 7 is a detail perspective view of a portion of a split tire retaining ring having a smooth inner face for use in connection with a Dunlop tire.

In the accompanying drawing in which is illustrated the preferred embodiment of the invention, 1 designates a rim constructed of metal and secured by any suitable means to a wooden felly 2. The felly 2 is connected with the outer ends of spokes 3 of an automobile or other vehicle wheel, which may be of any preferred construction. The rim 1, which is cylindrical, is provided at one of its side edges with an integral circumferential flange 4, having a groove 5 in its inner face to receive the longitudinal bead 6 of the adjacent side of the outer casing or shoe 7 of a pneumatic tire. The bead 8 at the opposite side of the outer casing or shoe engages a groove 9 in the inner side or face of a split ring 10, detachably mounted on the rim and coöperating with the fixed flange 4 in securing the pneumatic tire to the rim. The pneumatic tire, which is of the clencher type, may be of any preferred construction and has an inner tube 11 constructed in the usual manner, and it is equipped with a valve having a stem 12, which extends through registering openings 13 and 14 in the rim 1 and the felly 2 of the wheel.

The split ring, which is resilient, is constructed of suitable metal and is seated in a circumferential channel or groove 15, formed in the rim adjacent to the side edge thereof, as clearly illustrated in Fig. 2 of the drawing. The channel is segmental in cross section, and the inner periphery of the split ring is rounded transversely to fit the same, and said channel or groove being pressed in the rim provides a bead on the inner face of the latter. The rim is provided at the said channel with spaced integral lugs 16, extending across the circumferential channel and provided with straight radially arranged shoulders 17 and beveled faces 18, the beveled faces being located opposite each other and at opposite sides of an opening 19 in the rim. In said opening is mounted an approximately T-shaped locking device or member 20 for retaining the split ring in the channel and for holding the same in engagement with the fixed transverse lugs 16. The terminal portions of the split ring are provided at their inner peripheries with notches 21 conforming to the configuration of the lugs and snugly receiving the same and forming radially arranged shoulders for engaging the shoulders of the transverse lugs. The fixed transverse lugs of the rim and the notches in the inner periphery of the split ring interlock the latter with the rim and prevent the split ring from creeping or moving longitudinally in the channel 15.

Any other means for interlocking these two elements and holding them from relative movement would come within the purview of this invention.

The terminals 22 of the split ring are provided with opposite transverse recesses 23, which extend through the ring from the inner to the outer side, and which when the meeting ends of the ring are in abutting relation, form a substantially oblong opening or space to receive the oblong head of the T-shaped locking member. The ends of the split ring below said recesses are cut away a short distance at 24, to provide an entrance or mouth through which the head of the locking member is passed when applying the ring in place. To permit this the width of the head is less than the entrance 24. Its length is sufficient to span the meeting ends of the ring and be received in the said recesses 23. The locking member below the head is provided with a rounded stem or pivot 25, which is swiveled or journaled in the opening 19 of the rim, radially thereof, and is adapted to be rotated so as to dispose the oblong head longitudinally of the rim, which is the locking position, or transversely of the rim, which is the unlocking position. Fig. 4 of the drawing illustrates the two positions of the head in full and dotted lines; it being noted that the locking member rotates on an axis which is radial to the rim. When the locking member is turned to the position shown in dotted lines, its side edges coincide with the ends of the split ring at the cutaway portions 24. This permits the split ring to be passed over the head of the locking device and releases the split ring and also permits the terminal portions thereof to be sprung out of engagement with the fixed lugs 16 of the rim. When the oblong head of the T-shaped locking member is turned longitudinally of the rim, it is carried into the recesses 23 and rigidly holds the ring against outward movement, whereby the split ring is maintained in its interlocked relation with the rim. When the split ring is removed, the outer casing or shoe and the inner tube may be readily detached and replaced.

As a means for turning the locking member, I have provided an operating handle in the form of a hasp member 26, provided with a cam-shaped head 27 bifurcated to receive the end 28 of the stem and eccentrically pivoted to the same by a rivet or pin 29, or other suitable fastening device. The end 28 of the stem or pivot 25 is reduced and flattened at opposite sides to form a terminal ear to which the hasp member is pivoted. The pivot 29 of the hasp member extends in the same direction as the major diameter of the oblong head, and when the head of the locking member extends longitudinally of the rim and is in engagement with the terminal recesses of the split ring, the hasp member is arranged to swing transversely of the wheel into and out of engagement with the valve stem 12, and it is provided with a circular opening 30 through which the valve stem projects when the hasp member is swung inwardly against the inner periphery of the felly, as illustrated in Fig. 2 of the drawing. This inward swinging movement of the hasp member carries the cam-shaped head thereof into contact with the bead on the inner periphery of the rim, and the locking member is thereby drawn downwardly or inwardly into tight engagement with the terminals of the split ring, which are held firmly against the rim. The opening 30 is of a diameter to loosely receive the valve stem, which is depressed or forced inwardly to enable the hasp member to be swung into a position, which will permit the outer portion of the valve stem to extend through the opening 30. It is, therefore, necessary in order to swing the hasp member outwardly for releasing the split ring to first depress the valve stem and disengage the same from the hasp member. The resiliency of the inflated inner tube maintains the valve stem in an extended position and will return the valve stem to such position after the same has been pushed inwardly and is released. By this construction the valve stem operates as a locking device for securing the hasp in its engaging position. The outer portion 31 of the valve stem is threaded and receives a nut 32 and a cap 33 of the ordinary construction. The nut and cap positively fasten the hasp member on the extended portion of the valve stem, but there is no liability of the hasp being thrown outward by jar or vibration and accidentally releasing the locking member, even should the cap and the nut become lost from the threaded portion of the valve stem. The valve stem is of the usual type.

In some makes of automobiles the double ring construction is employed and the detachable ring of the present invention may be advantageously substituted for the outer ring of such double ring construction. The detachable ring may be constructed with either a straight side to adapt it for a Dunlop tire, or it may be curved to engage with a tire of the clencher type, and if desired a detachable ring may be employed embodying both of these features in order that it may be reversible to adapt it for engaging either class of tires.

In Fig. 7 of the drawings, the split tire retaining ring 34 is provided with a smooth, inner side face 35 to adapt it for use in connection with a Dunlop tire. The detachable ring is also provided at its inner edge with notches 36, and at its ends with recesses 37 constructed and operated in a manner similar to the notches 21 and the recesses 23 heretofore described.

Figure 8:
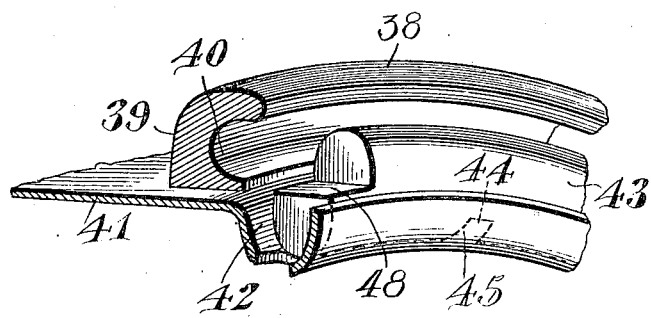
Fig. 8 is a detail sectional perspective view, showing a solid detachable and reversible ring having a straight face at one side for use in connection with a Dunlop tire, and a grooved face at the opposite side to engage a tire of the clencher type.
Figure 9:
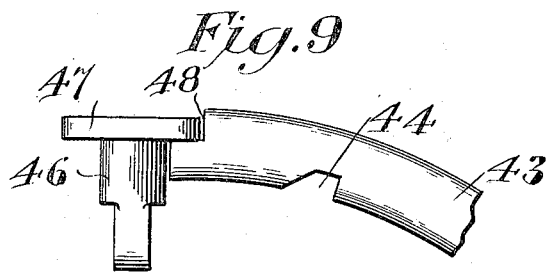
Fig. 9 is a detail view of the locking device for engaging the split ring shown in Fig. 8.

In Figs. 8 and 9 of the drawings, 38 designates a detachable ring provided at one side with a smooth face 39 to adapt it for use in connection with a Dunlop tire, and having a groove 40 at the opposite side to engage with the tire of the clencher type. The ring 38, which is continuous, is arranged upon the rim 41 at the inner side of the circumferential channel 42, which is adapted for the reception of a split ring 43 having notches 44 at its inner edge to engage with lugs 45 of the rim. The lugs 45 are located in the channel 42 and the ends of the detachable ring are retained in engagement with the said lugs 45 by means of a pivoted locking device 46 having a head 47 for engaging recesses 48 in the ends of the split ring 43.

The split ring 43 retains the ring 38 and the tire on the rim, and the ring 38 is reversible to arrange either its straight side 39 or its grooved side 40 in position for engaging a tire.

Some of the claims of this patent are generic to and sufficiently broad to comprehend the forms of the invention shown and described in my copending application filed on the 14th day of July, 1913, Serial Number 778,949, and my two patents issued on applications filed subsequently to this one, viz: Number 1,230,902, dated June 26, 1917, and 1,166,990, dated January 4, 1916, as each of the forms of the invention disclosed in said application and said patents includes a split retaining ring detachably mounted on the rim and interlocked therewith, a locking device revolubly mounted on the rim to rotate around a radial axis extending between the ends of the ring, said locking device having a locking portion carried by the rotary movement thereof into and out of locking engagement with the split ring, a handle at the inner end of the device for turning the locking member, and means for holding the handle locked.

In Patent No. 1,230,902, the invention is shown applied to a rim employing double rings similar to Figs. 8 and 9 of this patent. In Patent No. 1,166,990, the disclosure of the invention is made in connection with a demountable rim, showing that my invention is not limited in its use to any particular design of rim.

In my Patent 1,222,211, dated April 10, 1917, in which is disclosed a further modification of the generic invention herein claimed, I have disclosed how the locking member may be arranged in order to dispense with the use of a handle directly attached thereto.

What is claimed is:—

1. A device of the class described including a rim having an opening, a split ring mounted on the rim, a rotary locking member passed through the opening in the rim, and having a head on its outer end to engage the split ring, and an arm connected with the inner end of the rotary locking member for turning the same.

2. A device of the class described including a rim having an opening, a split ring mounted on the rim, a rotary locking member passed through the opening in the rim and having a head at its outer end to engage the split ring, an arm connected with the inner end of the rotary locking member for turning the same, and means mounted on the rim for locking the arm thereto.

3. A device of the class described including a rim, a split tire retaining ring detachably mounted on the rim and provided at its ends with outer meeting edges and having intermediate terminal recesses and cutaway at the inner walls of the recesses to provide an open space or entrance, and a locking member having an oblong head mounted for rotary movement on the rim and held against excessive radial movement, said head being of a width less than that of the open space or entrance to permit the split ring to be placed over it and adapted to be turned to carry it into and out of engagement with the terminal recesses.

4. A device of the class described including a rim, a split tire retaining ring mounted on the rim, a locking member mounted for rotary movement on the rim and having an engaging portion located at the ends of the ring and arranged to be carried into and out of engagement with the same by the said rotary movement, and a cam connected with the locking member and arranged to engage the rim to draw the locking member firmly into contact with the ring to bind the latter against the rim.

5. A device of the class described including a rim, a split tire retaining ring mounted on the rim, a locking member mounted for rotary movement on the rim and having an engaging portion located at the ends of the ring and carried into and out of engagement with the same by the rotary movement of the locking member, a hasp member having a cam portion eccentrically pivoted to the locking member and forming a handle for rotating the same and adapted to engage the rim to draw the locking member firmly into contact with the ring to bind the latter against the rim, and means for securing the hasp member in engagement with the rim.

6. A device of the class described including a rim having a circumferential channel and provided with fixed lugs extending across the channel, a split tire retaining ring detachably arranged in the channel and having notches engaging with the lugs of the rim, said ring being provided at its ends with recesses, a locking member composed of a stem or pivot extending through the rim, and a head arranged to be carried into and out of engagement with the said recesses by a rotary movement of the locking member, and a hasp member having a cam head eccentrically pivoted to the said stem or pivot and arranged to engage the rim to draw the ends of the ring tightly into engagement with the lugs of the rim.

7. In a device of the class described, the combination with a rim, and a tire arranged on the rim and provided with a valve stem extending through the rim, of a split tire retaining ring mounted on the rim, a locking member located at the ends of the split ring and having a stem or pivot extending through the rim, and a hasp member pivoted to the stem or pivot and forming a handle for operating the locking member and arranged to swing into and out of engagement with the valve stem, which retains the locking member in its engaging position.

8. In a device of the class described, the combination with a rim, and a tire arranged on the rim and provided with a valve stem extending through the rim, of a split tire retaining ring mounted on the rim, a locking member located at the ends of the split ring and having a stem or pivot extending through the rim, and a hasp member pivoted to the said stem or pivot and provided with an opening through which the valve stem extends to retain the locking member in its engaging position.

9. In a device of the class described, the combination with a rim, and a tire arranged on the rim and provided with a valve stem extending through the rim, of a tire retaining ring mounted on the rim, a locking member for the ring having a stem or pivot, and a hasp member pivoted to the said stem or pivot, and provided with an opening through which the valve stem extends to retain the locking member in its engaging position, the cap for the valve stem fitting over the latter to hold the hasp member in place.

10. A device of the class described including a rim having a circumferential channel and provided with fixed lugs extending across the channel, a split tire retaining ring detachably arranged in the channel and having notches in its inner edge engaging with the lugs of the rim, said ring being provided in its ends between its inner and outer edges with recesses, a locking member mounted for rotary movement between the ends of the split ring and engaging the said recesses to retain the ring in engagement with the lugs, and means provided on the inner side of the rim for holding the locking member in locked position.

11. A device of the class described including a rim, a split tire retaining ring detachably mounted on the rim and provided at its ends with opposite recesses, which when combined form a substantially oblong opening, said ends having an entrance leading from the said recesses inwardly, a locking member having a substantially oblong head, which is mounted for rotary movement within said recesses, said head being of a width less than the said entrance to the recesses to permit the split ring to be passed over it and said head being adapted to be turned to carry it into and out of engagement with the said recesses, a handle mounted on the inner end of the locking member and adapted to be used to turn the same, and means for holding the handle locked.

12. A device of the class described including a rim, a split tire retaining ring detachably mounted on the rim and interlocked therewith, a locking device revolubly mounted on the rim to rotate around a radial axis extending between the ends of the ring, said locking device having a locking portion carried by the rotary movement thereof into and out of locking engagement with the split tire retaining ring, a handle at the inner end of the device for turning the locking member, and means for holding the handle in fixed position.

13. A device of the class described, including a rim, a split tire retaining ring detachably mounted on the rim and interlocked therewith, a locking member pivoted on the rim to rotate on an axis which is radial to the rim and is located at the meeting ends of the ring, said locking member having a locking head adapted to be turned into and out of engagement with the split ring, and a handle at the inner end of the locking member to turn the same on its pivot.

14. A device of the class described including a rim having an opening, a split ring detachably mounted on the rim and interlocked therewith, a rotatable locking member passed through the opening in the rim and having a head on its outer end to engage the split ring and a stem to turn in said opening, said stem projecting beyond the inner face of the rim and provided with means by which the said member may be turned from locked to unlocked position.

15. A device of the class described including a rim having an opening, a split ring detachably mounted on the rim and provided with opposed recesses, lugs on the rim fitting in notches of the ring to interlock the ring to the rim, a rotatable locking member having a head on its outer end to fit in said recesses and hold the ring to the rim, said member being passed through the opening in the rim and projecting at its inner end at the inner side of the rim, and means on the inner end of the said member, whereby the same may be given a quarter turn to lock and unlock the ring from the rim.

In testimony, that I claim the foregoing as my own, I have hereto affixed my signature in the presence of two witnesses.

FRANK P. JOHNSON.

Witnesses:
   WM. L. SIDLER,
   HENRY F. GROVE.